United States Patent
Chae et al.

(10) Patent No.: US 10,334,645 B2
(45) Date of Patent: Jun. 25, 2019

(54) METHOD AND APPARATUS FOR TRANSMITTING SIGNAL FROM DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Hakseong Kim, Seoul (KR)

(73) Assignee: LG ELECTRONCIS INC., Seoul (KR)

( * ) Notice: Subject to any disclaimer, the term of this patent is extended or adjusted under 35 U.S.C. 154(b) by 75 days.

(21) Appl. No.: 14/910,549

(22) PCT Filed: Aug. 11, 2014

(86) PCT No.: PCT/KR2014/007427
§ 371 (c)(1),
(2) Date: Feb. 5, 2016

(87) PCT Pub. No.: WO2015/020498
PCT Pub. Date: Feb. 12, 2015

(65) Prior Publication Data
US 2016/0192425 A1 Jun. 30, 2016

Related U.S. Application Data

(60) Provisional application No. 61/864,521, filed on Aug. 9, 2013.

(51) Int. Cl.
*H04W 56/00* (2009.01)
*H04W 76/14* (2018.01)
(Continued)

(52) U.S. Cl.
CPC ............ *H04W 76/14* (2018.02); *H04L 43/16* (2013.01); *H04W 56/001* (2013.01); *H04W 56/005* (2013.01); *H04W 72/0446* (2013.01)

(58) Field of Classification Search
CPC .............................. H04W 76/02; H04W 56/00
See application file for complete search history.

(56) References Cited

U.S. PATENT DOCUMENTS

2010/0178912 A1* 7/2010 Gunnarsson .......... H04W 24/02
455/423
2011/0312317 A1* 12/2011 Sahin .................... H04W 16/16
455/422.1
(Continued)

FOREIGN PATENT DOCUMENTS

KR 10-2013-0035964 A 4/2013
WO WO 2013/100831 A1 7/2013

OTHER PUBLICATIONS

Alcatel-Lucent Shanghai Bell et al., "Timing of D2D transmissions and impact on the LTE system", 3GPP TSG RAN WG1 Meeting #73, R1-132071, May 20-24, 2013, 4 pages.
(Continued)

*Primary Examiner* — Brandon M Renner
(74) *Attorney, Agent, or Firm* — Birch, Stewart, Kolasch & Birch, LLP

(57) ABSTRACT

One embodiment of the present invention relates to a method for a second terminal receiving, from a first terminal, a device-to-device (D2D) signal in a wireless communication system, and more specifically, to a method for receiving a D2D signal comprising the steps of: setting a time window for receiving the D2D signal; and receiving the D2D signal, wherein the D2D signal is transmitted according to a D2D signal transmission timing of the first terminal,
(Continued)

which is determined by the first terminal based on a signal transmitted from a one or more timing reference nodes.

11 Claims, 11 Drawing Sheets

(51) Int. Cl.
*H04L 12/26* (2006.01)
*H04W 72/04* (2009.01)

(56) References Cited

U.S. PATENT DOCUMENTS

| | | | | |
|---|---|---|---|---|
| 2013/0058315 | A1* | 3/2013 | Feuersanger | H04W 52/281 370/336 |
| 2013/0172036 | A1 | 7/2013 | Miklós et al. | |
| 2013/0316727 | A1* | 11/2013 | Edge | H04W 4/02 455/456.1 |
| 2014/0241257 | A1* | 8/2014 | Ding | H04W 48/08 370/329 |
| 2014/0355557 | A1* | 12/2014 | Peng | H04W 16/14 370/330 |
| 2015/0094064 | A1* | 4/2015 | Lei | H04W 36/03 455/436 |
| 2015/0181366 | A1* | 6/2015 | Chae | H04W 56/004 370/336 |
| 2015/0208404 | A1* | 7/2015 | Yie | H04L 1/1861 370/329 |
| 2015/0341934 | A1* | 11/2015 | Sorrentino | H04B 7/2656 370/329 |

OTHER PUBLICATIONS

LG Electronics et al., "Way forward on D2D signal transmission timing", 3GPP TSG RAN WG1 Meeting #73, May 20-24, 2013, R1-132739, 4 pages.

\* cited by examiner

FIG. 5
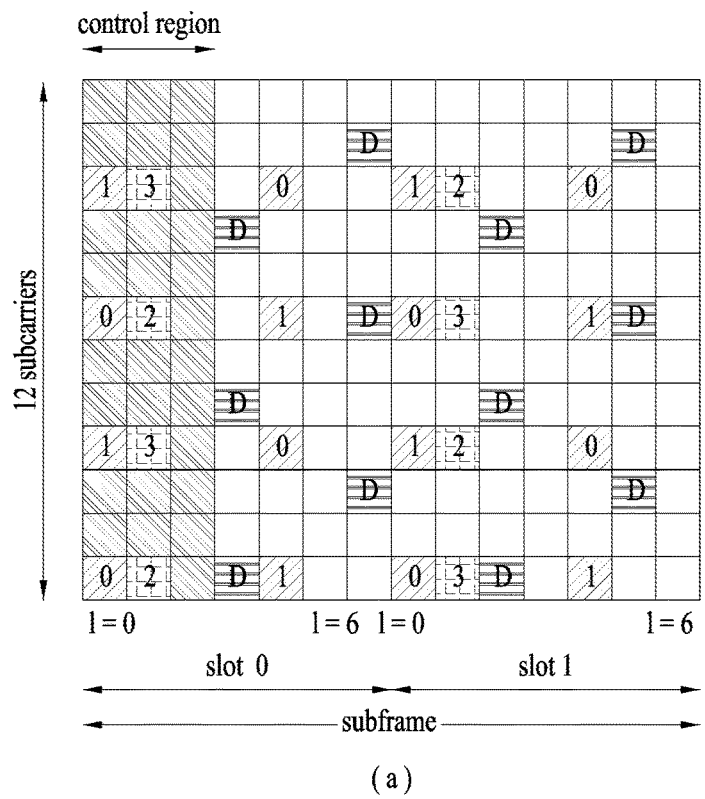
(a)
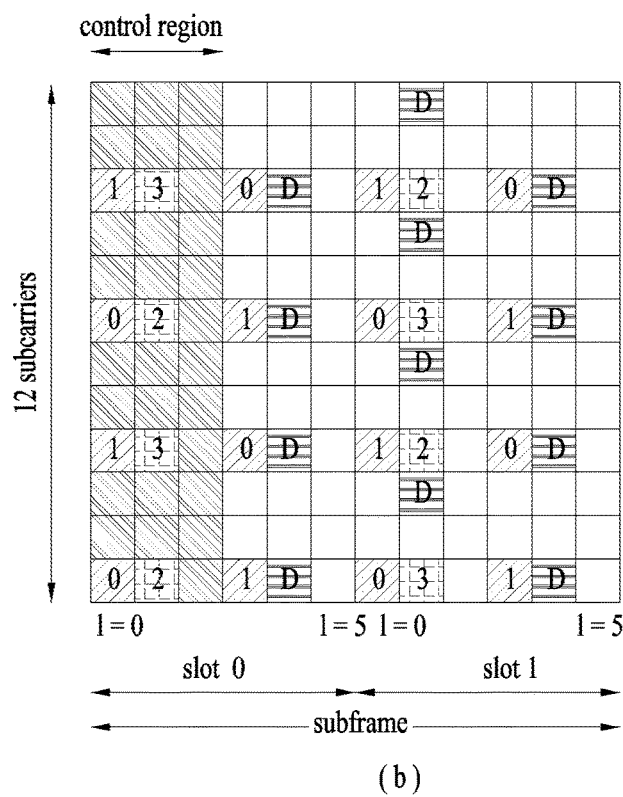
(b)

METHOD AND APPARATUS FOR TRANSMITTING SIGNAL FROM DEVICE-TO-DEVICE TERMINAL IN WIRELESS COMMUNICATION SYSTEM

CROSS REFERENCE TO RELATED APPLICATIONS

This application is the National Phase of PCT International Application No. PCT/KR2014/007427, filed on Aug. 11, 2014, which claims priority under 35 U.S.C. 119(e) to U.S. Provisional Application No. 61/864,521, filed on Aug. 9, 2013, all of which are hereby expressly incorporated by reference into the present application.

TECHNICAL FIELD

The present invention relates to a wireless communication system, and more particularly, to a method of obtaining transmission timing in device-to-device (D2D) communication, a method of receiving a D2D signal using a timing window and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE OF THE INVENTION

Technical Task

A technical task of the present invention is to provide a method of obtaining transmission timing in D2D communication and a method of receiving a D2D signal using a timing window.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of receiving a device-to-device (D2D) signal, which is received by a second user equipment (UE) from a first UE in a wireless communication system, includes setting a time window for receiving the D2D signal and receiving the D2D signal. In this case, the D2D signal can be transmitted according to D2D signal transmission timing of the first UE, which is determined by the first UE based on a signal transmitted from one or more synchronization reference nodes.

To further achieve these and other advantages and in accordance with the purpose of the present invention, according to a second technical aspect of the present invention, a second UE receiving a device-to-device (D2D) signal from a first UE in a wireless communication system can include a receive module and a processor configured to set a time window for receiving the D2D signal, the processor configured to receive the D2D signal. In this case, the D2D signal can be transmitted according to D2D signal transmission timing of the first UE, which is determined by the first UE based on a signal transmitted from one or more synchronization reference nodes.

The first and the second technical aspect can include all or a part of items described in the following.

If the number of the synchronization reference node is one, the D2D signal transmission timing of the first UE is determined based on reception timing for receiving, by the first UE, a signal transmitted from the synchronization reference node and an offset value and if the number of synchronization reference node is two or more, the D2D signal transmission timing of the first UE is determined based on reception timing of signals respectively transmitted from the two or more synchronization reference nodes.

If the number of the synchronization reference node is two or more, the D2D signal transmission timing of the first UE may correspond to a weighted average of time taken for receiving signals respectively transmitted from the two or more synchronization reference nodes.

The two or more synchronization reference nodes may transmit a signal, which is received with signal quality equal to or greater than a threshold, to the first UE.

A weight, which is greater than a weight applied to a synchronization reference node corresponding to a UE, can be applied to a synchronization reference node corresponding to an eNB among the two or more synchronization reference nodes.

If the number of the synchronization reference node is one, the second UE can set the time window for receiving the D2D signal based on time taken for receiving a signal transmitted from the synchronization reference node.

If the number of the synchronization reference node is two or more, the second UE can set the time window for receiving the D2D signal under an assumption that the first UE has transmitted the D2D signal on D2D signal transmission timing of the second UE.

The D2D signal transmission timing of the second UE may correspond to a weighted average of time taken for receiving signals respectively transmitted from the two or more synchronization reference nodes.

A size of the time window can be determined according to the number of the synchronization reference node.

If the number of the synchronization reference node is two or more, the size of the time window may be smaller than the size of the time window when the number of the synchronization reference node is one.

If a size of the time window is greater than a cyclic prefix, the second UE can perform timing estimation in the time window.

If a size of the time window is smaller than a cyclic prefix, the second UE can ignore the time window.

Advantageous Effects

According to the present invention, although a D2D UE is in an idle state, it is able to obtain D2D transmission timing and a timing window necessary for receiving a D2D signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for explaining a reference signal;

BEST MODE

Mode for Invention

Figure 1:
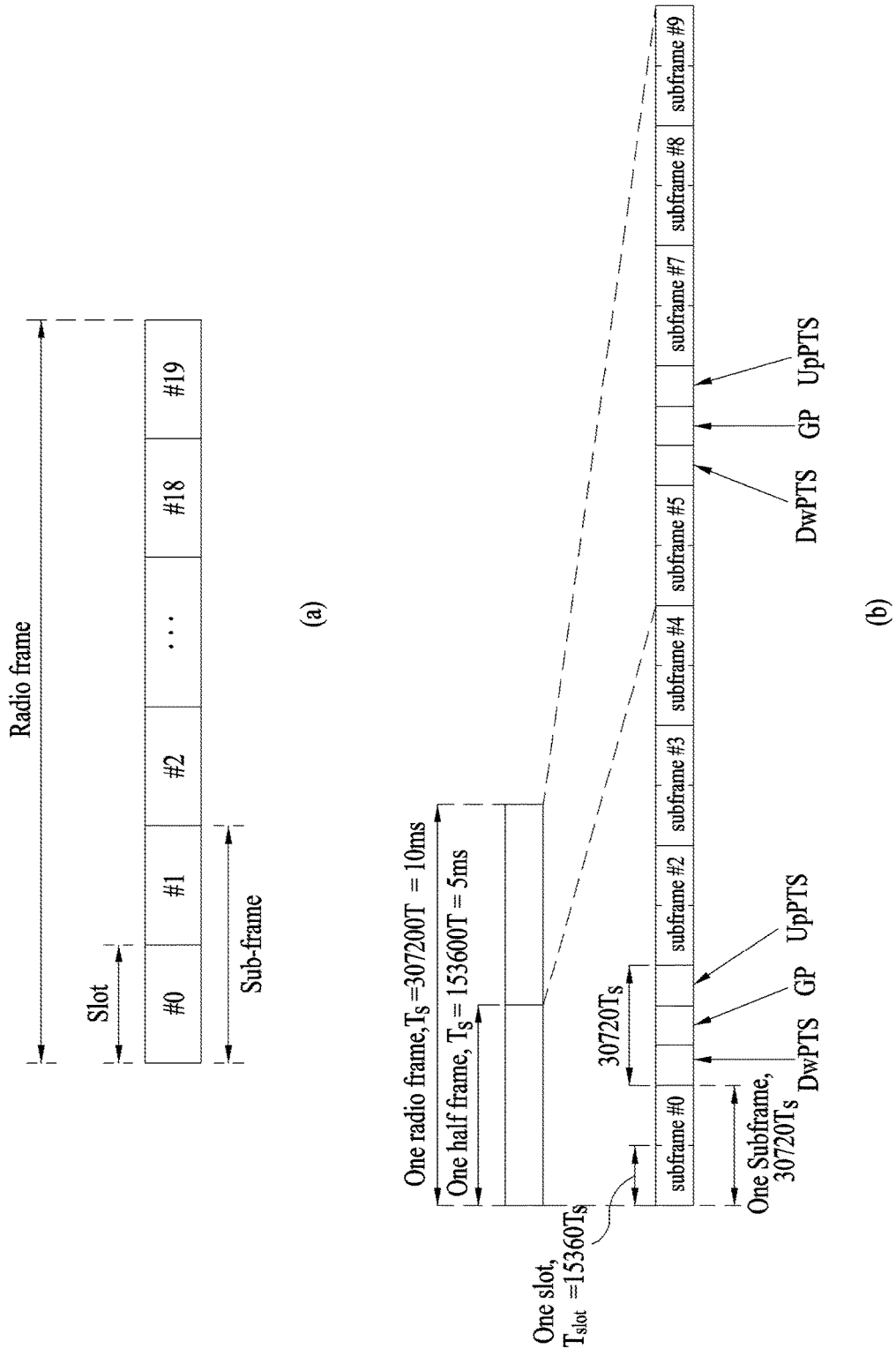
FIG. 1 is a diagram for a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
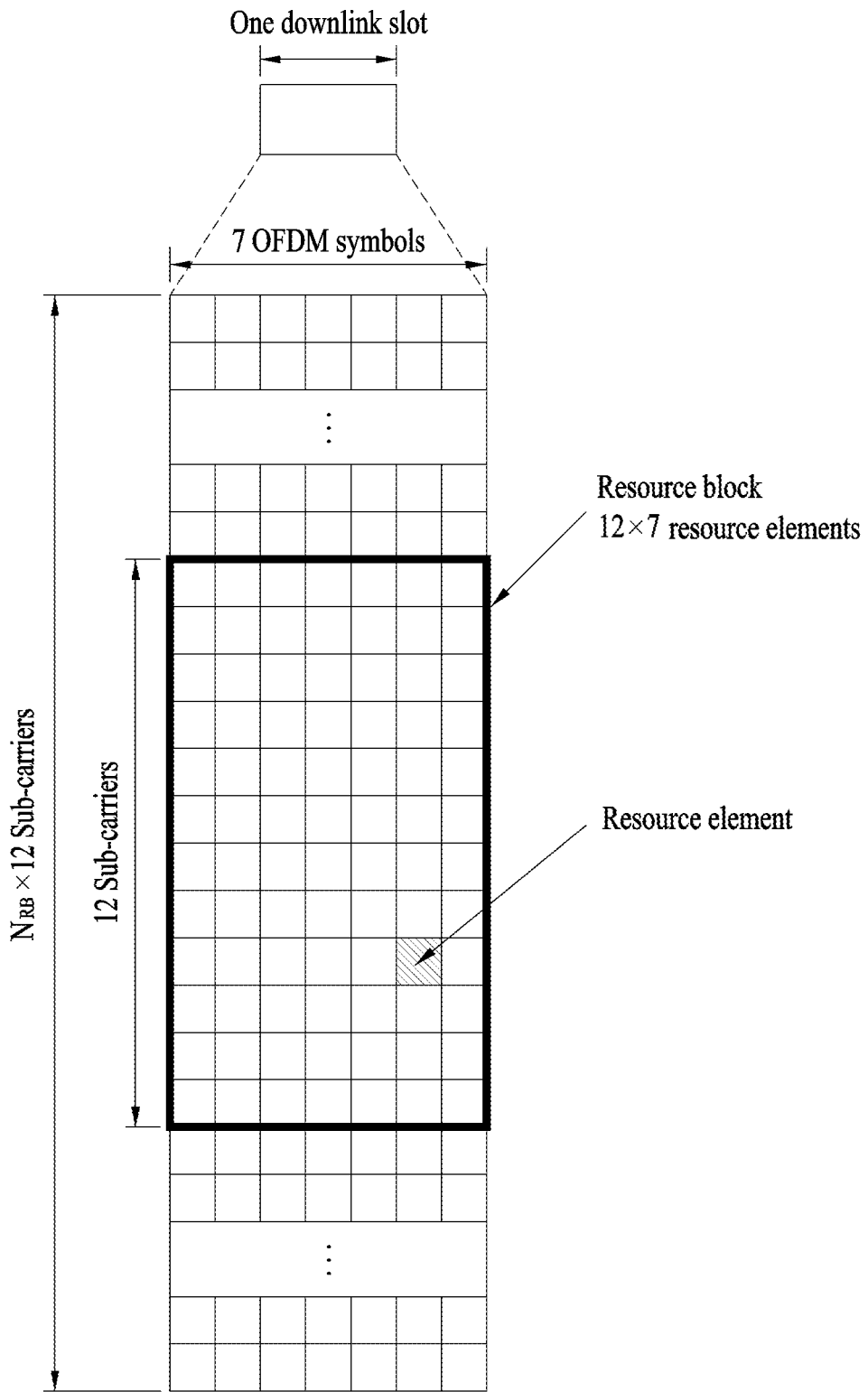
FIG. 2 is a diagram for a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
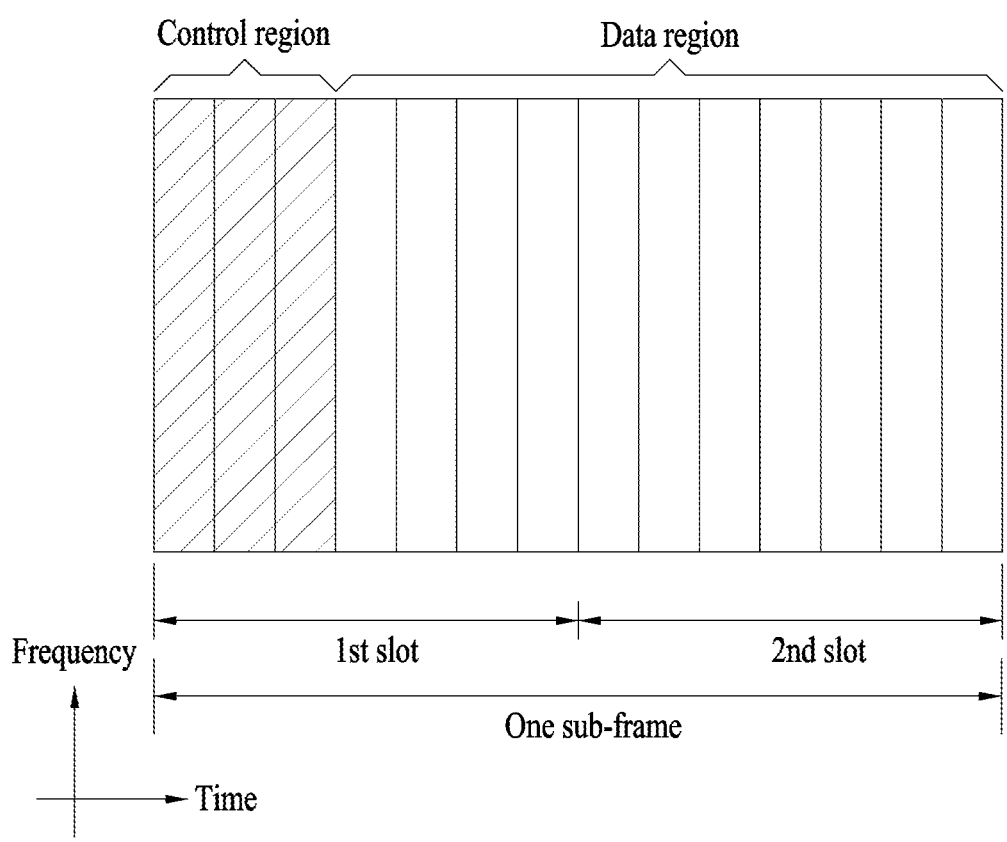
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARM) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over interne protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
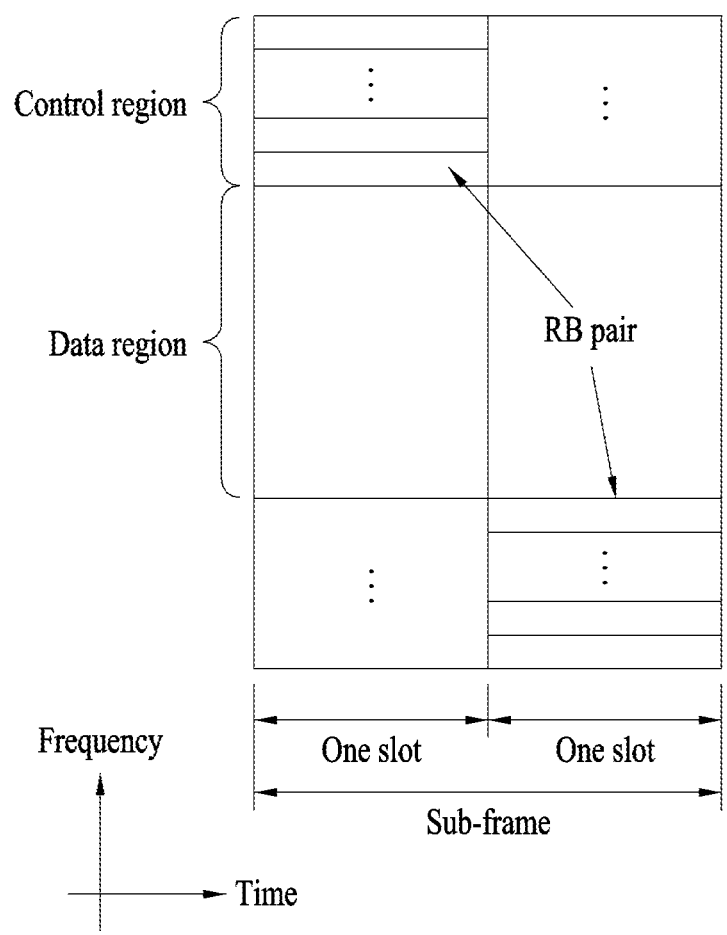
FIG. 4 is a diagram for a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Figure 6:
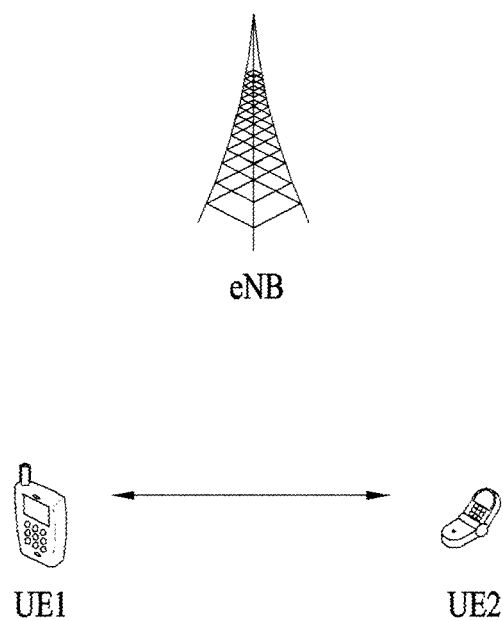
FIGS. 6 to 9 are diagrams for explaining determination of D2D signal transmission timing according to embodiments of the present invention.

Meanwhile, as shown in FIG. 6, In order for two UEs (UE1 and UE2) to perform UE-to-UE communication, a UE of one side (UE1) should identify existence of another UE (UE2). This can be performed through a D2D discovery signal. In order to transmit and receive the discovery signal, it is necessary to perform synchronization of a prescribed level between two UEs. Of course, it is also necessary to perform the synchronization when a communication signal is transmitted and received as well as the discovery signal. If a UE participating in D2D communication is in an idle state, the UE knows reception timing of a signal transmitted from an SRN (synchronization reference node) only. Hence, it is necessary for the UE in the idle state to have a method of obtaining synchronization necessary for transmitting and receiving a D2D signal. In the following, a method of determining D2D transmission timing, an operation of a D2D reception UE and the like according to embodiments of the present invention are explained based on the aforementioned explanation. Prior to the following explanation, a synchronization reference node may correspond to a base station, a D2D UE, a GPS satellite or the like. A UE can estimate reference signal reception timing and/or a frequency offset in a manner of detecting a specific reference signal transmitted from a synchronization reference node. The specific reference signal can be periodically or aperiodically transmitted. The specific reference signal may correspond to a reference signal of a form defined by legacy LTE/LTE-A system or a reference signal newly defined for D2D communication. A scope of the present invention may be non-limited by a form of a reference signal.

Determining D2D Signal Transmission Timing

When a second UE receives a D2D signal from a first UE, in other word, when the first UE transmits the D2D signal, the D2D signal can be transmitted according to D2D signal transmission timing of the first UE, which is determined based on signals transmitted from one or more synchronization reference nodes. In this case, the D2D signal transmission timing of the first UE can be determined based on methods/elements different from each other according to the number of synchronization reference nodes. If the number of synchronization reference node corresponds to one, the D2D signal transmission timing of the first UE is determined based on reception timing of the first UE of a signal transmitted form the synchronization reference node and an offset value. If the number of synchronization reference node corresponds to two or more, the D2D signal transmission timing of the first UE can be determined based on reception timing of the first UE of signals respectively transmitted from two or more synchronization reference nodes. Regarding this, it shall be described with reference to FIGS. 7 to 9 in the following.

Figure 7:
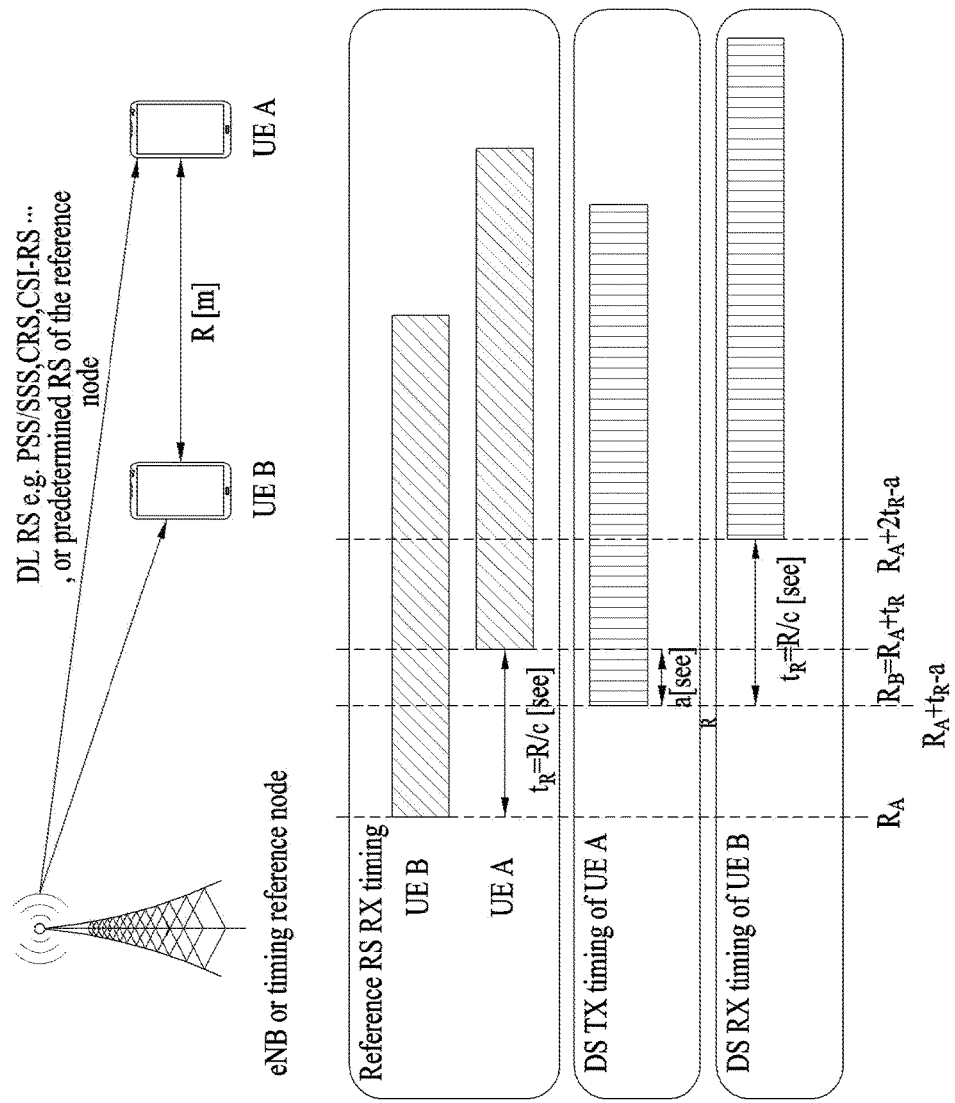

FIG. 7 shows a method of determining D2D signal transmission timing of a UE when there exists a single synchronization reference node. As shown in FIG. 7, a first UE (UE A) and a second UE (UE B) are separated from each other as much as R(m) and the first UE and the second UE can receive a downlink reference signal (e.g., PSS/SSS, CRS, CSI-RS, a predetermined reference signal, etc.) from a synchronization reference node (eNB or timing reference node). In FIG. 7, a corresponds to an offset value and may corresponds to a positive number or a negative number. The a may correspond to a value configured by a network or a predetermined value. And, c may indicate radio velocity. In this environment, transmission timing of a D2D signal can be determined as Formula 1 in the following.

$$T_{D2D}=f(SRN)+a \qquad [\text{Formula 1}]$$

In this case, f(TRN) corresponds to a value induced from reception timing of a synchronization reference node and a corresponds to the offset value. The a may correspond to a timing advance value or a value induced from the timing advance value.

If the number of a synchronization reference node corresponds to two or more, D2D transmission timing may correspond to an average or a weighted average of time taken for receiving signals respectively transmitted from two or more synchronization reference nodes.

The number of synchronization reference nodes involved in averaging (reference synchronization reference nodes) may correspond to a value configured by a network or a predetermined value. The two or more synchronization reference nodes can transmit a signal, which is received with signal quality (e.g., RSRP (reference signal received power), RSRQ (reference signal received quality)) equal to or greater than a threshold, to the first UE and/or the second UE. A UE can determine whether or not a received signal is transmitted from a reference synchronization reference node. In this case, it may use a threshold of signal quality, information included in a synchronization-related packet transmitted by network/higher layer/physical layer signaling or a synchronization reference node, ID information and the like. For example, when a synchronization reference node transmits a synchronization-related packet together with a reference signal, a threshold indicating whether or not a UE uses the synchronization reference node as a reference synchronization reference node can be transmitted together. Or, a synchronization reference node corresponding to a specific ID may become a reference synchronization reference node.

Among two or more synchronization reference nodes, a higher weigh can be applied to a synchronization reference node corresponding to a base station compared to a synchronization reference node corresponding to a UE. As an example, it may be able to exclude the synchronization node corresponding to the UE in a manner of putting all weights to the synchronization reference node corresponding to the base station. Or, if a specific sequence is detected, it may be able to put a relatively big weight to the sequence (a synchronization reference node which has transmitted the sequence).

Figure 8:
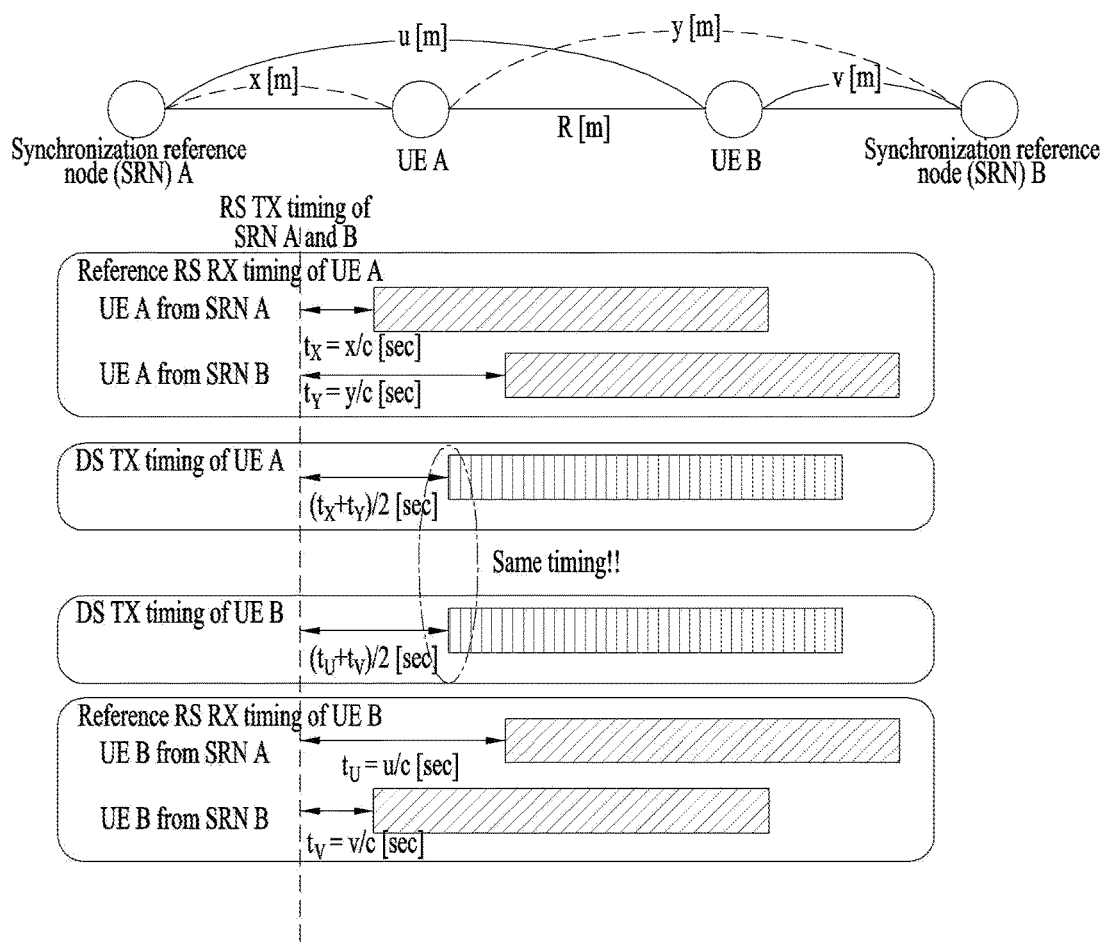

FIG. 8 shows an example for a method of determining transmission timing of a D2D signal when there exist two or more synchronization reference nodes. Referring to FIG. 8, a first UE (UE A) can determine transmission timing of the first UE based on time (tx=x/c) taken for receiving a signal transmitted from a first synchronization reference node (SRN A) and time (ty=y/c) taken for receiving a signal transmitted from a second synchronization reference node (SRN B). More specifically, the D2D signal transmission timing of the first UE may correspond to an average ((tx+ty)/2) of time taken for receiving signals respectively transmitted from two or more synchronization reference nodes. In case of a second UE (UE B), similar to the first UE (UE A), transmission timing of the second UE can be determined based on time (tx=u/c) taken for receiving a signal transmitted from the first synchronization reference node (SRN A) and time (ty=v/c) taken for receiving a signal transmitted from the second synchronization reference node (SRN B). As shown in the drawing, since x+y equals to u+m, the D2D signal transmission timing of the first UE determined by the aforementioned scheme is identical to the D2D signal transmission timing of the second UE. Of course, if both a UE and a synchronization reference node do not exist on a straight line, although D2D signal transmission timing of two UEs are not completely identical to each other, it may have transmission timing very similar to each other. By doing so, it may be able to reduce a timing window in which precise timing estimation is performed by a D2D signal reception UE. Moreover, it is able to reduce an amount of power consumed for timing search. And, the aforementioned method can solve a problem that signal synchronization is not matched between cluster boundaries in a situation of performing clustering on the basis of a specific synchronization reference node.

Figure 9:
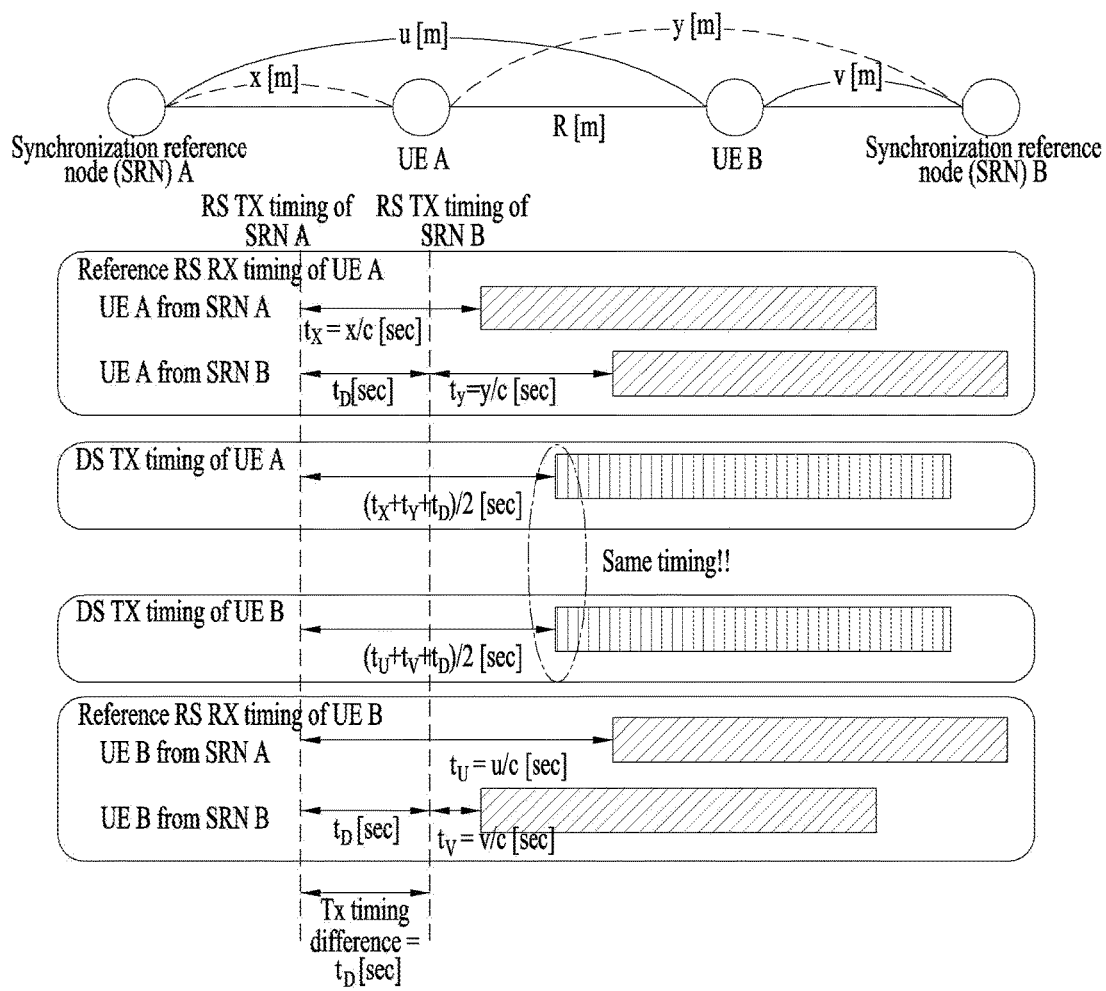

Subsequently, FIG. 9 shows a method of determining D2D transmission timing when transmission timing of a first synchronization reference node and transmission timing of a second synchronization reference node are different from each other. As shown in FIG. 9, although transmission timing of two or more synchronization reference nodes is different from each other, similar to the case of FIG. 8, it may be able to obtain almost same or identical D2D transmission timing.

Configuration of D2D Time Window

If D2D transmission timing of a UE is determined using the aforementioned method or a different method, a D2D signal reception UE (second UE) sets a time window and may be able to perform timing estimation in the time window. In this case, a size of the time window can be determined according to the number of synchronization reference nodes. Specifically, if there exists a single synchronization reference node, referring to FIG. 7, D2D signal reception timing of a second UE (UE B) can be separated from timing on which a signal received by the second UE from the synchronization reference node as much as maximum 2R/c. in particular, in case of a single synchronization reference node, maximum timing error may occur as much as 2R/c. Hence, the second UE sets a timing window as much as 2R/c and may be able to perform delicate timing estimation via such a reference signal as a DMRS, PSS/SSS, etc. of a D2D signal in the timing window.

If there are two or more synchronization reference nodes, as mentioned in the foregoing description, UEs can transmit a D2D signal on timing almost identical to each other. In particular, the UEs can obtain D2D transmission timing almost same with each other. Hence, a second UE assumes that a first UE has transmitted a D2D signal on D2D signal transmission timing of the second UE and may be then able to set a time window for receiving the D2D signal. Since D2D signal transmission timing of the first UE and D2D signal transmission timing of the second UE are almost same (in case of FIG. 8, identical to each other), a timing window can be set to R/c corresponding to propagation delay. In particular, if there exist two or more synchronization reference nodes, it may have a time window smaller than a size of a time window of a single synchronization reference node.

In the foregoing description, if the size of the time window is greater than a CP (cyclic prefix), the second EU performs timing estimation in the time window. If the size of the time window is smaller than a CP, the second UE can ignore the time window. In particular, if the size of the time window is smaller than a CP length, the second UE determines it as all received signals exist within the CP length without performing separate timing adjustment and may be able to perform demodulation.

Figure 10:
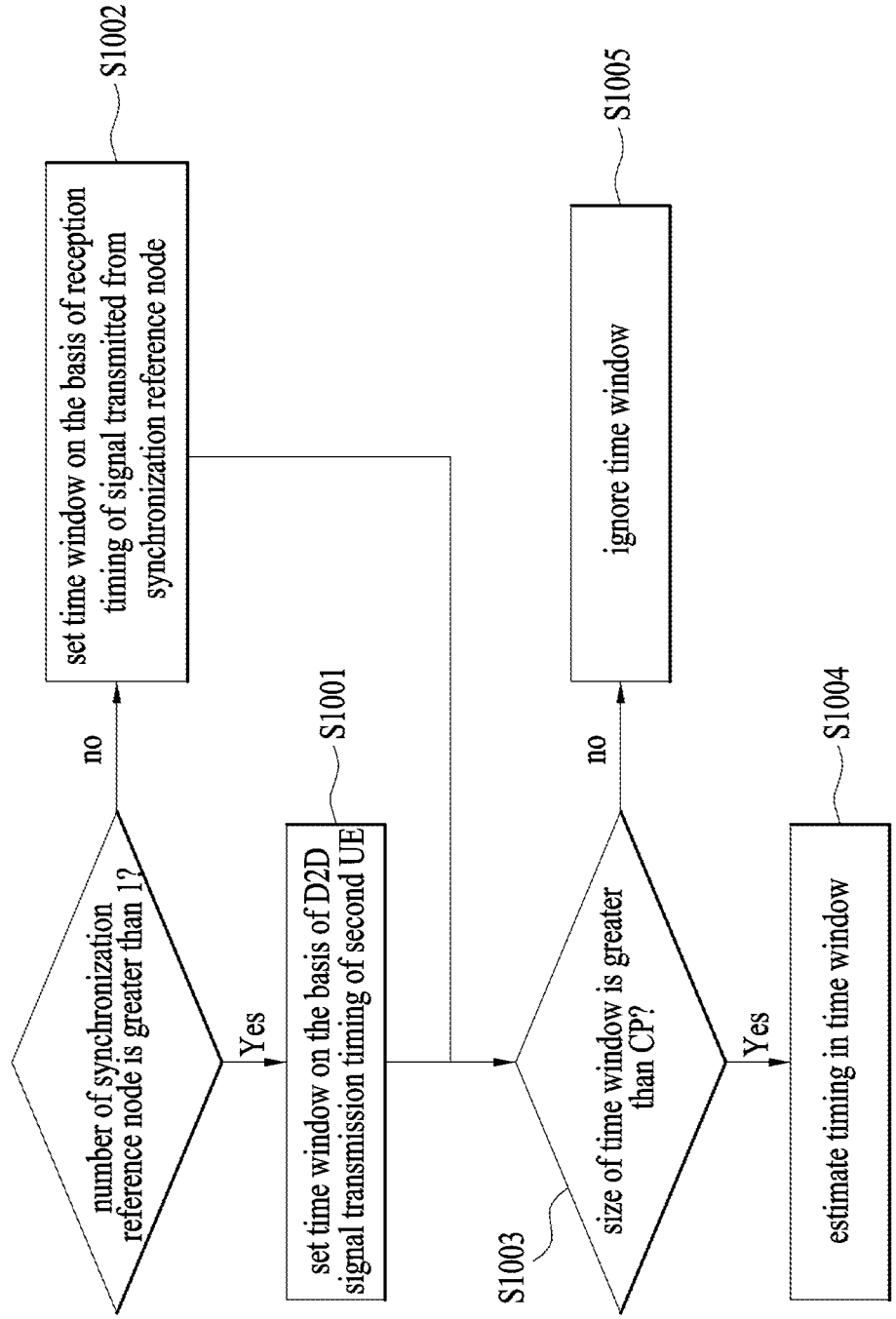
FIG. 10 is a diagram for explaining a timing window necessary for receiving a D2D signal according to embodiments of the present invention.

FIG. 10 is a flowchart for a method of setting the aforementioned timing window and operations related to the timing window. Referring to FIG. 10, if the number of synchronization reference node is greater than 1, a second UE can set a time window on the basis of transmission timing of the second UE S1001. If there exists a single synchronization reference node, the second UE can set a time window on the basis of reception timing of a signal transmitted from the synchronization reference node S1002. In both cases, if a size of a timing window is greater than a CP, timing estimation is performed S1004. If the size of the timing window is smaller than the CP, it may be able to ignore the timing window (i.e., delicate timing estimation is not performed).

Although the proposed method is explained as a method for a D2D transmission UE to determine transmission timing, the method can also be applied to a case that a D2D signal transmission and reception frequency offset is corrected in a manner of separately estimating a frequency offset from a plurality of SRNs and averaging or weight averaging the estimated frequency offset. In particular, the D2D transmission UE estimates a frequency offset from a plurality of SRNs, averages (weight averages) the estimated frequency offset and uses the average (or weighted average) for the purpose of correcting an offset of a frequency oscillator of the D2D transmission UE. In this case, the number of reference SRNs for correcting the frequency offset may be identical to the number of SRNs for timing. Or, the number of reference SRNs for correcting the frequency offset can be provided in advance irrespective of the number of SRNs for timing. The number of reference SRNs for correcting the frequency offset can be signaled by a network. A method of determining an SRN for correcting a frequency offset may correspond to one of the proposed methods for determining transmission timing.

Configurations of Devices for Embodiments of the Present Invention

Figure 11:
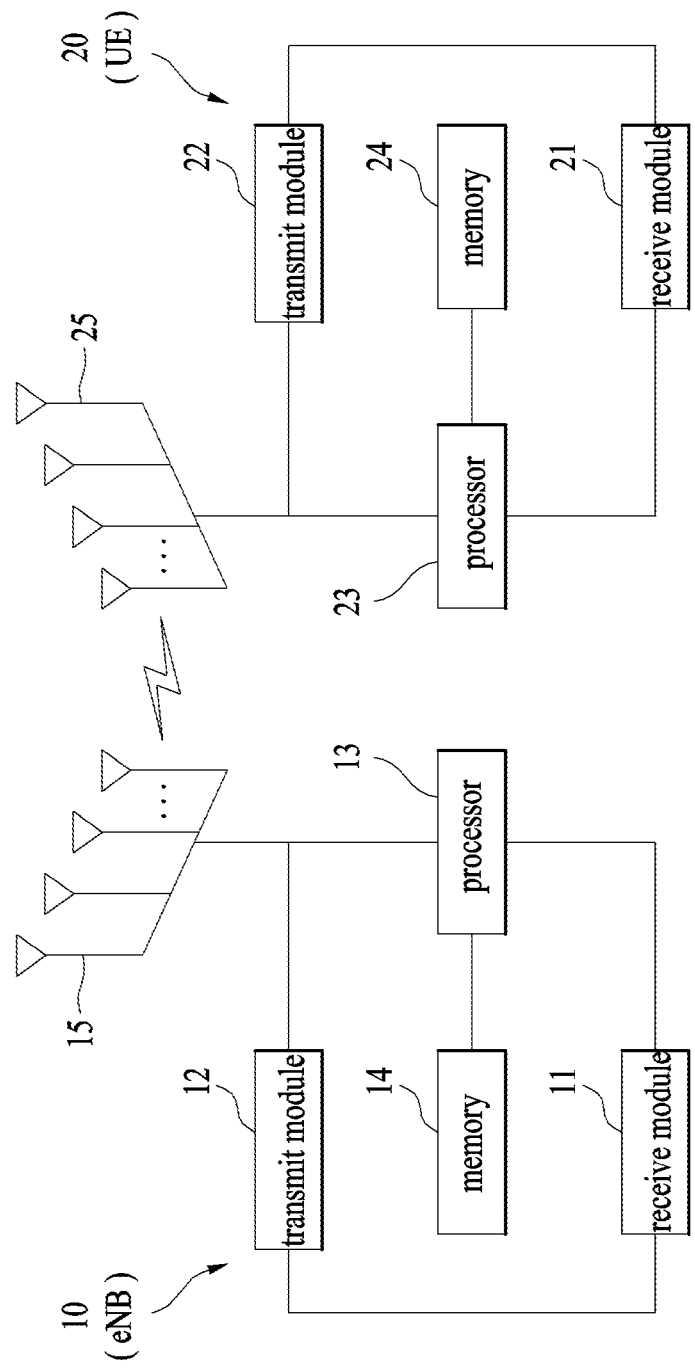
FIG. 11 is a diagram for a configuration of a transceiver.

FIG. 11 is a diagram illustrating configuration of a transmit point apparatus and a UE according to one embodiment of the present invention.

Referring to FIG. 11, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 11, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 11 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of receiving a device-to-device (D2D) signal, by a second user equipment (UE), from a first UE in a wireless communication system, the method comprising:
    setting a time window for receiving the D2D signal based on reception timing for receiving, by the second UE, a signal transmitted from one or more synchronization reference nodes; and
    receiving, by the second UE, the D2D signal from the first UE within the time window,
    wherein a size of the time window is 2R/c when the number of the synchronization reference nodes is one, and the size of the time window is R/c when the number of the synchronization reference nodes are two or more, wherein R is a distance between the first UE and the second UE, and c is radio velocity, and
    wherein transmission timing of the D2D signal transmitted by the first UE is determined based on reception timing for receiving, by the first UE, a signal signal-transmitted from one or more synchronization reference nodes.

2. The method of claim 1, wherein:
    when the number of the synchronization reference nodes is one, the transmission timing of the D2D signal is determined based on reception timing for receiving, by the first UE, a signal transmitted from the one synchronization reference node and an offset value, and
    when the number of the synchronization reference nodes is two or more, the transmission timing of the D2D signal is determined based on reception timing of signals respectively transmitted from the two or more synchronization reference nodes.

3. The method of claim 1, wherein when the number of the synchronization reference nodes is two or more, the transmission timing of the D2D signal is related to a weighted average of time taken for receiving signals respectively transmitted from the two or more synchronization reference nodes.

4. The method of claim 3, wherein the two or more synchronization reference nodes transmit a signal, which is received with signal quality equal to or greater than a threshold, to the first UE.

5. The method of claim 3, wherein a weight, which is greater than a weight applied to a synchronization reference node related to a UE, is applied to a synchronization reference node corresponding to an eNB among the two or more synchronization reference nodes.

6. The method of claim 1, wherein when the number of the synchronization reference nodes is one, the second UE sets the time window for receiving the D2D signal based on time taken for receiving a signal transmitted from the one synchronization reference node.

7. The method of claim 1, wherein when the number of the synchronization reference nodes is two or more, the second UE sets the time window for receiving the D2D signal under an assumption that the first UE has transmitted the D2D signal on transmission timing of D2D signal of the second UE.

8. The method of claim 7, wherein the transmission timing of the D2D signal of the second UE corresponds to a weighted average of time taken for receiving signals respectively transmitted from the two or more synchronization reference nodes.

9. The method of claim 1, wherein when the size of the time window is greater than a cyclic prefix, the second UE performs timing estimation in the time window.

10. The method of claim 1, wherein when the size of the time window is smaller than a cyclic prefix, the second UE ignores the time window.

11. A second user equipment (UE) for receiving a device-to-device (D2D) signal from a first UE in a wireless communication system, the second UE comprising:
    a receiver; and
    a processor configured to:
        set a time window for receiving the D2D signal based on reception timing for receiving, by the second UE, a signal transmitted from one or more synchronization reference nodes, and
        control the receiver to receive the D2D signal from the first UE within the time window,
    wherein a size of the time window is 2R/c when the number of the synchronization reference nodes is one, and the size of the time window is R/c when the number of the synchronization reference nodes are two or more, wherein R is a distance between the first UE and the second UE, and c is radio velocity, and
    wherein transmission timing of the D2D signal transmitted by the first UE is determined based on reception timing for receiving, by the first UE, a signal transmitted from one or more of synchronization reference nodes.

* * * * *